(12) United States Patent
Wu et al.

(10) Patent No.: US 10,805,119 B2
(45) Date of Patent: *Oct. 13, 2020

(54) METHODS AND DEVICES FOR CHANNEL ESTIMATION

(71) Applicant: HON HAI PRECISION INDUSTRY CO., LTD., New Taipei (TW)

(72) Inventors: Wen-Rong Wu, Hsinchu (TW); Pen-Yao Lu, Hsinchu (TW)

(73) Assignee: HON HAI PREICISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,914

(22) Filed: Feb. 27, 2020

(65) Prior Publication Data

US 2020/0195474 A1 Jun. 18, 2020

Related U.S. Application Data

(63) Continuation of application No. 16/218,480, filed on Dec. 13, 2018, now Pat. No. 10,630,511.

(60) Provisional application No. 62/598,414, filed on Dec. 13, 2017.

(51) Int. Cl.
*H04L 25/02* (2006.01)
*H04L 27/26* (2006.01)

(52) U.S. Cl.
CPC ...... *H04L 25/0212* (2013.01); *H04L 25/0204* (2013.01); *H04L 25/025* (2013.01); *H04L 25/0258* (2013.01); *H04L 27/2611* (2013.01); *H04L 27/2647* (2013.01)

(58) Field of Classification Search
CPC ............. H04L 25/0212; H04L 25/0258; H04L 25/025; H04L 27/2611; H04L 25/0204; H04L 27/2647
USPC .................................................. 375/260, 340
See application file for complete search history.

(56) References Cited

U.S. PATENT DOCUMENTS

| 10,630,511 B2 * | 4/2020 | Wu | H04L 25/025 |
| 2010/0111232 A1 * | 5/2010 | Papadopoulos | H04L 1/06 375/340 |
| 2016/0355278 A1 * | 12/2016 | Goodman | B64D 45/00 |
| 2017/0281013 A1 * | 10/2017 | Natarajan | A61B 5/14551 |

* cited by examiner

*Primary Examiner* — Fitwi Y Hailegiorgis
(74) *Attorney, Agent, or Firm* — ScienBiziP, P.C.

(57) ABSTRACT

A method for channel estimation, performed by a wireless transmit/receive unit (WTRU), includes: receiving a plurality of input signals, generating a plurality of sensing matrices for the input signals, generating an augmented sensing matrix and an augmented observation vector according to the sensing matrices and the input signals, estimating a plurality of channel delay parameters according to the augmented sensing matrix and the augmented observation vector, and estimating channel information according to the channel delay parameters.

20 Claims, 4 Drawing Sheets

METHODS AND DEVICES FOR CHANNEL ESTIMATION

CROSS-REFERENCE TO RELATED APPLICATIONS

The application is a continuation of and claims priority under 35 U.S.C. § 120 to U.S. application Ser. No. 16/218, 480, filed Dec. 13, 2018, entitled "METHODS AND DEVICES FOR CHANNEL ESTIMATION", which claims the benefit of U.S. Provisional Application Ser. No. 62/598, 414, filed on Dec. 13, 2017, and entitled "LOW-COMPLEXITY COMPRESSIVE SENSING BASED TIME-VARIANT CHANNEL ESTIMATION METHOD FOR OFDM SYSTEMS", which is hereby incorporated fully by reference herein.

FIELD

The present disclosure generally relates to methods and devices for channel estimation in wireless communication.

BACKGROUND

Channel estimation plays an important role in wireless communication systems (e.g., Orthogonal Frequency Division Multiplexing (OFDM) systems), since the accurate Channel State Information (CSI) can significantly improve the equalization and then enhance the system performance.

Millimeter-wave (mmWave) has been considered in the next-generation (e.g., fifth generation (5G) New Radio (NR)) wireless communication system, and however, it is known that the Doppler shift is severer due to higher central frequency. In such cases, channel is more likely to change in one symbol (e.g., one OFDM symbol) interval.

Thus, there is a need in the art for devices and methods for channel estimation for the next-generation wireless communication system.

SUMMARY

The present disclosure is directed to methods and devices for channel estimation in wireless communication.

In one aspect of the present disclosure, a method for channel estimation and performed by a Wireless Transmit/Receive Unit (WTRU) is provided. The method includes receiving a plurality of input signals, generating a plurality of sensing matrices for the input signals, generating an augmented sensing matrix and an augmented observation vector according to the sensing matrices and the input signals, estimating a plurality of channel delay parameters according to the augmented sensing matrix and the augmented observation vector, and estimating channel information according to the channel delay parameters.

In another aspect of the present disclosure, a WTRU including a receiver and a processor is provided. The receiver is configured to receive a plurality of input signals. The processor is coupled to the receiver and configured to generate a plurality of sensing matrices for the input signals, generate an augmented sensing matrix and an augmented observation vector according to the sensing matrices and the input signals, estimate a plurality of channel delay parameters according to the augmented sensing matrix and the augmented observation vector, and estimate channel information according to the channel delay parameters.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
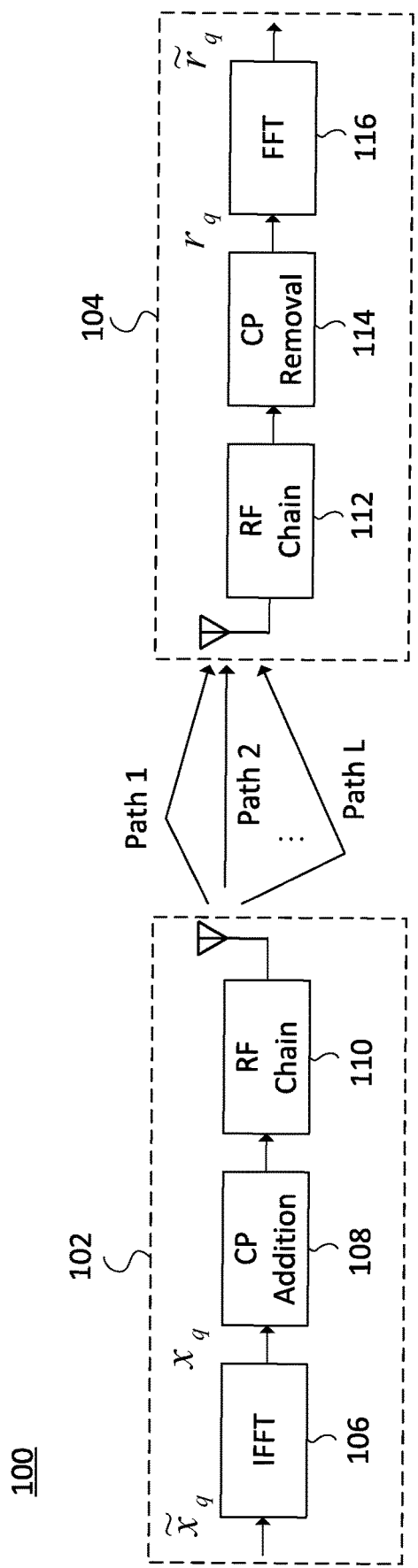
FIG. 1 is a schematic diagram of a wireless communication system, in accordance with an implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

In addition, the terms "system" and "network" herein may be generally interchangeably used. The term "and/or" herein is only an association relationship for describing associated objects, and represents that three relationships may exist, for example, A and/or B may represent that: A exists alone, A and B exist at the same time, and B exists alone. In addition, the character "/" herein generally represents that the former and latter associated objects are in an "or" relationship.

According to various implementations of the present disclosure, Compressive Sensing (CS) techniques may be applied to OFDM time-invariant channel estimation. For the mmWave environment, wireless channels tend to be sparse, meaning that the number of nonzero paths is small. CS can make use of the sparsity, allowing a better estimation performance in time-domain channel estimation. Besides, CS needs fewer pilot symbols for the channel estimation, resulting a higher the spectral efficiency.

For time-variant channel, a large Doppler shift may affect the orthogonality of the subcarriers, causing Inter Carrier Inference (ICI). Due to ICI, the received pilot symbols may be contaminated, and CS may not be directly applied. Thus, in some cases, before applying CS techniques, the ICI has to be mitigated. However, the procedure of ICI mitigation often involves high computational complexity. Another problem is the quasi-static assumption usually made for OFDM systems, meaning that the channel response does not change within an OFDM symbol. In practice, this assumption may not be held under high-mobility environments.

In various implementations of the present disclosure, methods and devices for channel estimation are provided. For convenience, only an SISO-OFDM system is considered for digital arrays. However, it is noted that the idea can be extended to the case of Single Input Single Output (SISO)-OFDM or Multiple Input Multiple Output (MIMO)-OFDM systems with hybrid arrays.

FIG. 1 is a schematic diagram of a wireless communication system 100 (e.g., an OFDM system), in accordance with an implementation of the present disclosure. As shown in FIG. 1, the wireless communication system 100 includes a plurality of Wireless Transmit/Receive Units (WTRU), e.g., WTRUs 102 and 104. Each of the WTRUs may be any type of device configured to operate and/or communicate in a wireless environment. For example, the WTRUs may be configured to transmit and/or receive wireless signals and may include User Equipment (UE), a base station, a personal computer, a wireless sensor, consumer electronics, and the like.

In the wireless communication system 100, data is modulated into signals at the WTRU 102, and is then transmitted to the WTRU 104 through a plurality of wireless channels. In a real environment, the wireless channels of the wireless communication system 100 may vary along with the environment and time. When transmitted to the WTRU 104, the received signals at the WTRU 104 may be different from the ones transmitted from the WTRU 102 for that the signals are prone to distortion due to changes and/or interferences of the wireless channels. Thus, at the WTRU 104, in order to recover the received input signals from distortion, the effects of the wireless channels need to be estimated. In some implementations, the channel estimation is implemented using training signals or pilot signals (symbols). For example, for the pilot-based channel estimation, multiple pilot signals are placed in specific subcarrier(s) of the OFDM symbols within specific period(s) by the WTRU 102, and the known pilot signals may then be used at the WTRU 104 to calculate the channel information (e.g., channel response(s)).

Consider the wireless communication system 100 with a Fast Fourier Transform (FFT) size of N and Cyclic Prefix (CP) of I. In the wireless communication system 100, Q consecutive OFDM symbols may be transmitted as training signals or pilot signals by the WTRU 102. Let the frequency domain symbol vector be denoted as $\tilde{x}_q \in C^{N \times 1}$, where q is an OFDM symbol index ranging from 1 to Q, and C represents the complex domain. At the WTRU 102, the N-point Inverse Fast Fourier Transform (IFFT) module 106 transforms each $\tilde{x}_q$ into a time domain OFDM symbol $x_q = F^{-1} \tilde{x}_q$, where $x_q \in C^{N \times 1}$ and F is an N×N Discrete Fourier Transform (DFT) matrix. After adding CP by the CP addition module 108, each OFDM symbol is then transmitted by the Radio Frequency (RF) chain 110 over multiple time-variant wireless channels and corrupted by noise (e.g., Additive White Gaussian Noise, AWGN), $w_q$.

At the WTRU 104, the RF chain 112 may receive the transmitted OFDM symbols from the WTRU 102. The received time domain OFDM symbol (after CP removal by the CP removal module 114), denoted as $r_q \in C^{N \times 1}$, is then converted by the FFT module 116 into a frequency domain signal (symbol), which is denoted by $\tilde{r}_q = F r_q$, where $\tilde{r}_q \in C^{N \times 1}$.

According to various implementations of the present disclosure, the time-variant wireless channels between the WTRU 102 and the WTRU 104 can be modeled as an equivalent channel as follows. As shown in FIG. 1, the number of paths (e.g., paths 1 to L) between the WTRU 102 and the WTRU 104 is L. The equivalent channel is assumed to be sparse, e.g., L<<N. Denote $\alpha_l(n)$ and $k_l$ as the response and the delay of the path-l channel, respectively. The (channel) response $\alpha_l(n)$ may change with an OFDM sample index n. The number (e.g., L) of the paths and the delays (e.g., $k_l$) of the paths are fixed over the Q consecutive OFDM symbols.

Figure 2:
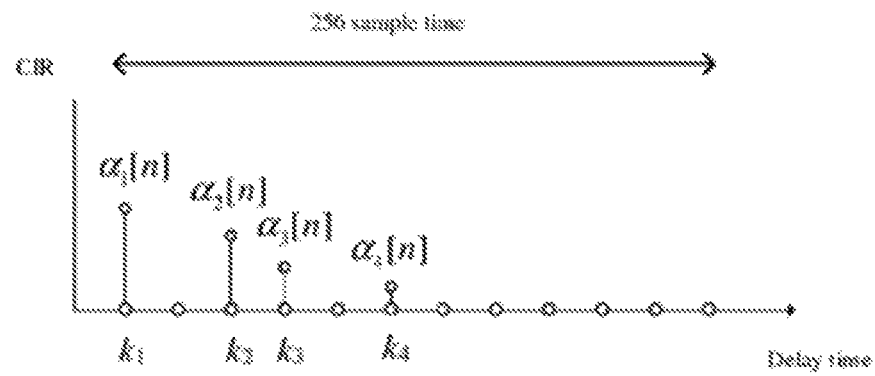
FIG. 2 is an illustrative example of the Channel Impulse Response (CIR) in different delay times.

FIG. 2 is an illustrative example of the Channel Impulse Response (CIR) in different delay times with L=4 at time index n with an FFT size of 256. Here the response $\alpha_l(n)$ over the Q consecutive OFDM symbols is approximated by a linear function with a start point value $g_l^a$ and a constant slope $g_l^p$. Thus, $\alpha_l(n)=g_l^a+g_l^p \times n$. The linear approximation can be used to model the time-variant wireless channels for the normalized Doppler frequency up to 20%. As shown in FIG. 2, for the p-th received OFDM symbol, the CIRs of the L (e.g., four) paths at the sample time n includes responses $\alpha_1(n)$, $\alpha_2(n)$, $\alpha_3(n)$ and $\alpha_4(n)$, with delays $k_1$, $k_2$, $k_3$ and $k_4$, respectively.

Figure 3:
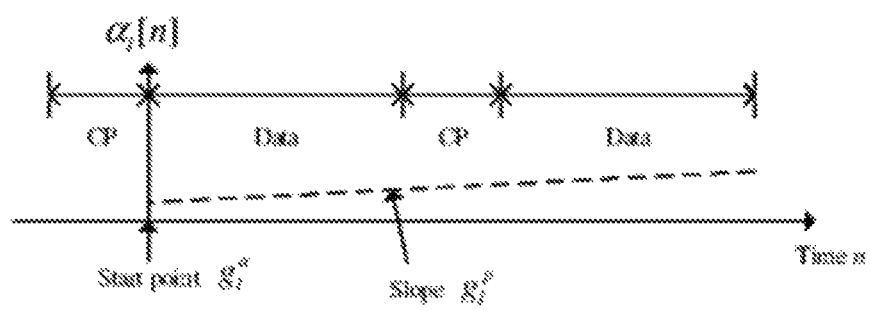
FIG. 3 is an illustrative example of the linear approximation of the channel response of a certain wireless path.

FIG. 3 is an illustrative example of the linear approximation of the channel response of the l-th path. As shown in FIG. 3, the response $\alpha_l(n)$ of the l-th path over the received OFDM symbols changes with a constant rate (slop $g_l^p$) over time, from the start point value of $g_l^a$.

Figure 4:
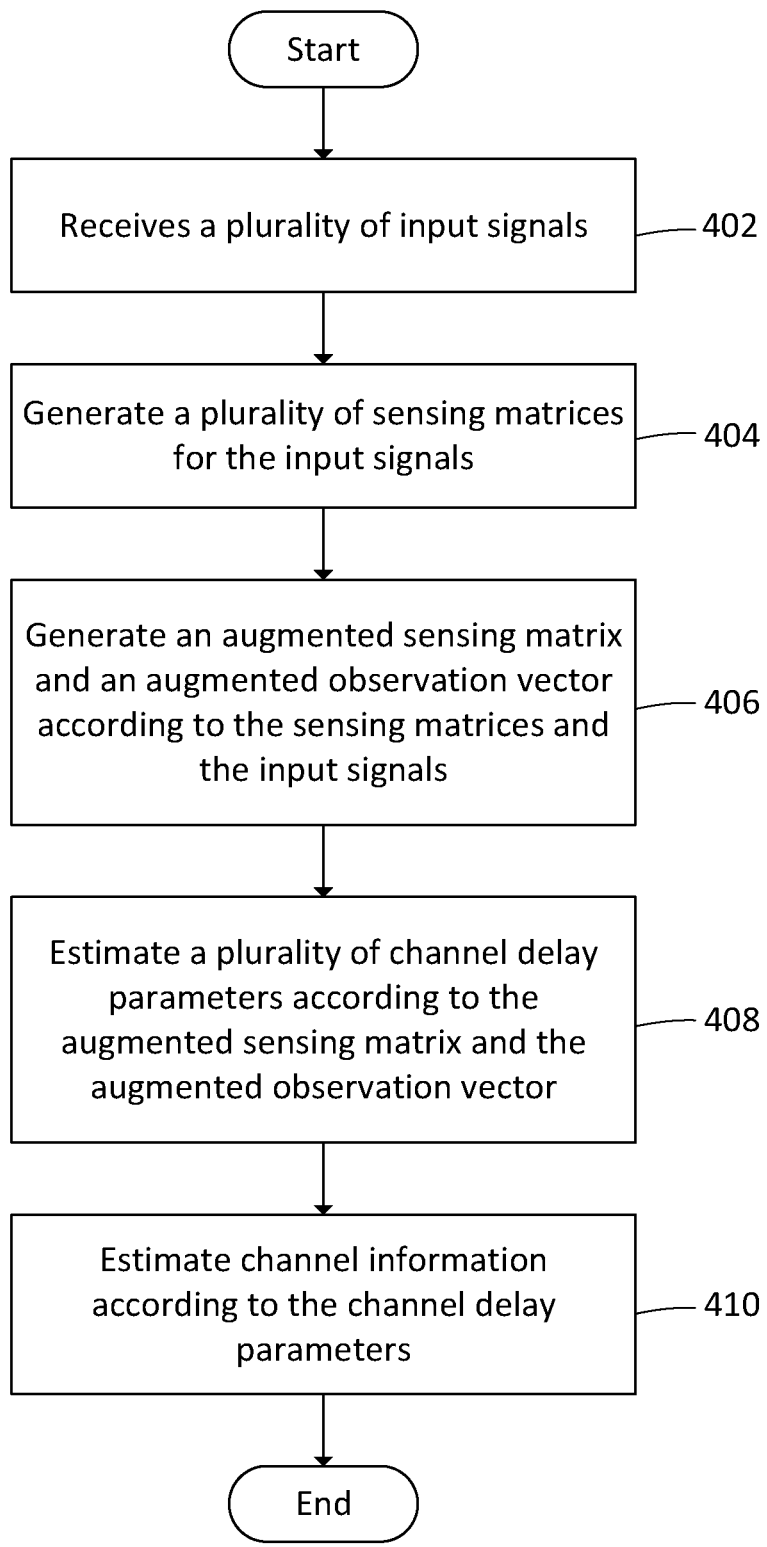
FIG. 4 is a flowchart of a method for channel estimation, in accordance with an implementation of the present disclosure.

FIG. 4 is a flowchart of a method for channel estimation, in accordance with an implementation of the present disclosure. The flowchart includes actions 402, 404, 406, 408 and 410.

In action 402, the WTRU (e.g., WTRU 104 in FIG. 1) receives a plurality of input signals. For example, the input signals include Q OFDM symbols used as pilot signals.

In action 404, the WTRU generates a plurality of sensing matrices for the input signals. For example, the WTRU may calculate a plurality of sensing matrices $\phi_q$ for q=1, 2, ..., Q. For simplicity, the column vectors $g^a \in C_{I \times 1}$ and $g^p \in C^{I \times 1}$ are defined for $g_l^a$ and $g_l^p$ in the CP range. Let x(k) denotes the k-th element of a vector x. Then, $g^a(k)=g_l^a$ and $g^p(k)=g_l^p$, for $\tau=k_l$, and $g^a(k)=g^p(k)=0$ elsewhere. Thus, there are only L nonzero elements in $g^a$ and $g^p$. Based on the channel model, the q-th time-domain received OFDM symbol (input signal) can be expressed as $r_q=[G_a+V_qG_p]x_q+w_q$. The matrices $G_a$, $G_p$, and $V_q$ are defined as $G_a \equiv cir(g^a)$, $G_p \equiv cir(g^p)$, and $V_q \equiv dia([(q-1)(N+1), (q-1)(N+1)+1, ..., (q-1)(N+I)-I-1])$, respectively, where cir(a) denotes a circulant matrix with the first column vector being a, and diag(a) denotes a diagonal matrix with diagonal elements being a. After FFT, the input signal $r_q$ is converter into a frequency domain signal (symbol) $\tilde{r}_q=[(\tilde{G}_a+\tilde{V}_q\tilde{G}_p]+\tilde{x}_q+\tilde{w}_q$, where $\tilde{G}_a=FG_aF^{-1}$, $\tilde{G}_p \equiv FG_pF^{-1}$ and $\tilde{V}_q \equiv FV_qF^{-1}$. Then, $\tilde{r}_q$ can be rewritten as $$\tilde{r}_q = [\tilde{X}_q \quad F'\tilde{V}_q\tilde{X}_qF'] \begin{bmatrix} g^a \\ g^p \end{bmatrix} + \tilde{w}_q \quad (1)$$

where $\tilde{X}_q=diag(\tilde{x}_q)$ and $F' \in C^{N \times I}$ is the matrix constructed by the first I columns of the DFT matrix F. Note that $\tilde{V}_q$ is a circulant matrix. As a result, $[\tilde{X}_q \ F' \ \tilde{V}_q\tilde{X}_q \ F']$ is no longer diagonal, and $\tilde{r}_q(i)$ is contaminated by $\tilde{x}_q(j)$ for $i \neq j$. This problem can be handled by, for example, ignoring off diagonal elements and approximating $\tilde{V}_q$ by a diagonal matrix, denoted as $\tilde{V}'q$. With $\tilde{V}'_q$, the pilot symbols (or training signals) can be extracted from $\tilde{r}_q$ for channel estimation. Let the vectors $\tilde{r}_q^S$, $\tilde{x}_q^S$ and $\tilde{w}_q^s$ be subvectors of $\tilde{r}_q$, $\tilde{x}_q$ and $\tilde{w}_q$ with the elements corresponding to pilot positions.

Then, the observation vector {tilde over (r)}qS can be expressed as $$\tilde{r}_q^S = [\tilde{X}_q^S \quad (F')^S(\tilde{V}_q)^S\tilde{X}_q^S(F')^S] \begin{bmatrix} g^a \\ g^p \end{bmatrix} + \tilde{w}_q^S = \Phi_q \begin{bmatrix} g^a \\ g^p \end{bmatrix} + \tilde{w}_q^S \quad (2)$$

where $\tilde{X}_q^S \equiv diag(\tilde{x}_q^S)$, and $(\tilde{V}_q)^S$ and $(F')^S$ are obtained from $\tilde{V}_q$ and F' with rows corresponding to the pilot positions, respectively. From (2), it can be seen that $\Phi_q$ is the sensing matrix for the observation vector $\tilde{r}_q^S$ and it can be calculated with $\tilde{X}_q^S$, $(\tilde{V}_q)^S$ and $(F')^S$.

Note that the number of unknowns for channel estimation is doubled compared to the time-invariant scenario. From (2), the unknown parameters $g^a$ and $g^p$ are not functions of q. This implies that the observation vector $\tilde{r}_q^S$, q=1, 2, ..., Q can be used to estimate $g^a$ and $g^p$ and the performance loss due to more unknowns can be effectively mitigated.

In action 406, the WTRU generates an augmented sensing matrix and an augmented observation vector according to the sensing matrices and the input signals. For example, once the sensing matrices $\Phi_q$ for the Q received OFDM symbols (input signals) are calculated, the WTRU may then concatenate the sensing matrices $\Phi_q$, q=1, 2 ... Q into an augmented sensing matrix $A \equiv [\Phi_1^T \ \Phi_2^T \ ... \ \Phi_Q^T]^T$. The WTRU may also extract a plurality of observation vectors $\tilde{r}_q^S$ from the frequency domain signals $\tilde{r}_q$ according to the positions of the pilot signals, and concatenate the observation vectors $\tilde{r}_q^S$, q=1, 2, ..., Q into the augmented observation vector $y \equiv [(\tilde{r}_1^S)^T (\tilde{r}_2^S)^T ... (\tilde{r}_Q^S)^T]^T$.

In action 408, the WTRU estimates channel delay parameters according to the augmented sensing matrix and the augmented observation vector. For example, from (2), the augmented observation vector y can be approximated as the following equation:

$$y \approx A \begin{bmatrix} g^a \\ g^p \end{bmatrix} + \begin{bmatrix} \tilde{w}_1^S \\ \tilde{w}_2^S \\ \vdots \\ \tilde{w}_Q^S \end{bmatrix} \quad (3)$$

In some implementations, the WTRU may perform a CS algorithm using the augmented sensing matrix and the augmented observation vector to estimate the channel delay parameters $g^a$ and $g^p$ accordingly. Note that the number of the nonzero elements of the unknown vector $[(g^a)^T (g^p)^T]^T$ is 2L<<2I. Since $[(g^a)^T (g^p)^T]^T$ is sparse, and thus many existing CS techniques may be employed to search the indices of nonzero elements, e.g., path delay parameters from (3).

In action 410, the WTRU estimates channel information (e.g., $\hat{g}^a(k_i)$, $\hat{g}^p(k_i)$, i=1, 2, ..., L) according to the channel delay parameters. For example, after the path delay parameters $g^a$ and $g^p$ are estimated, the WTRU may then estimate the corresponding channel information by using the Least-Squares (LS) algorithm, which is shown as follows:

$$\begin{bmatrix} \hat{g}^a(k_1) \\ \vdots \\ \hat{g}^a(k_L) \\ \hat{g}^p(k_1) \\ \vdots \\ \hat{g}^p(k_L) \end{bmatrix} = (\bar{A}^H\bar{A})^{-1}\bar{A}^H y$$

where $\bar{A}$ is obtained from A with columns corresponding to zero elements in $[(g^a)^T(g^p)^T]^T$ removed. Thus, the WTRU completes the channel estimation.

Figure 5:
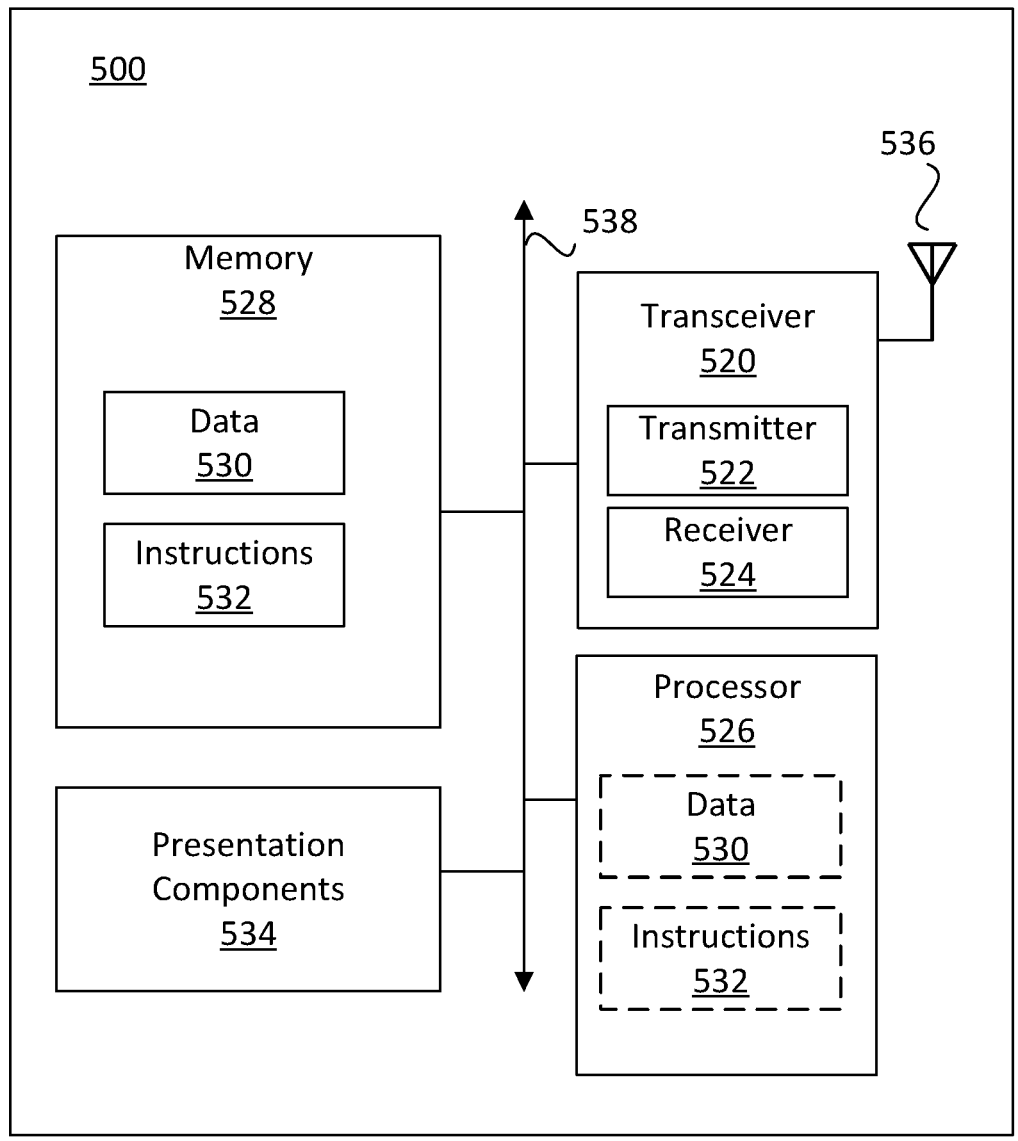
FIG. 5 illustrates a block diagram of a WTRU for wireless communication, in accordance with various aspects of the present application.

FIG. 5 illustrates a block diagram of a WTRU for wireless communication, in accordance with various aspects of the present application. As shown in FIG. 5, a WTRU 500 may include a transceiver 520, a processor 526, a memory 528, one or more presentation components 534, and at least one antenna 536. The WTRU 500 may also include an RF spectrum band module, a base station communications module, a network communications module, and a system communications management module, input/output (I/O) ports, I/O components, and power supply (not explicitly shown in FIG. 5). Each of these components may be in communication with each other, directly or indirectly, over one or more buses 540. In one implementation, the WTRU 500 may be a UE or a base station that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The WTRU 500 may include a variety of computer-readable media. Computer-readable media can be any available media that can be accessed by the WTRU 500 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 528 may include computer-storage media in the form of volatile and/or non-volatile memory. The memory 528 may be removable, non-removable, or a combination thereof. Exemplary memory includes solid-state memory, hard drives, optical-disc drives, and etc. As illustrated in FIG. 5, The memory 528 may store computer-readable, computer-executable instructions 532 (e.g., software codes) that are configured to, when executed, cause the processor 526 to perform various functions described herein, for example, with reference to FIGS. 1 through 10. Alternatively, the instructions 532 may not be directly executable by the processor 526 but be configured to cause the WTRU 500 (e.g., when compiled and executed) to perform various functions described herein.

The processor 526 (e.g., having processing circuitry) may include an intelligent hardware device, e.g., a central processing unit (CPU), a microcontroller, an ASIC, and etc. The processor 526 may include memory. The processor 526 may process the data 530 and the instructions 532 received from the memory 528, and information through the transceiver 520, the base band communications module, and/or the network communications module. The processor 526 may also process information to be sent to the transceiver 520 for transmission through the antenna 536, to the network communications module for transmission to a core network.

One or more presentation components 534 presents data indications to a person or other device. Exemplary presentation components 534 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A wireless transmit/receive unit (WTRU) comprising:
a receiver configured to receive a plurality of input signals;
a processor coupled to the receiver and configured to:
generate a plurality of sensing matrices for the input signals;
generate an augmented sensing matrix and an augmented observation vector according to the sensing matrices and the input signals;
estimate a plurality of channel delay parameters by performing a Compressive Sensing (CS) algorithm using the augmented sensing matrix and the augmented observation vector; and
estimate channel information according to the channel delay parameters.

2. The WTRU according to claim 1, wherein the processor is further configured to:
concatenate the sensing matrices to generate the augmented sensing matrix.

3. The WTRU according to claim 1, wherein the input signals include a plurality of pilot signals.

4. The WTRU according to claim 3, wherein the processor is further configured to:
transform the input signals into a plurality of frequency domain signals;
extract a plurality of observation vectors from the frequency domain signals according to positions of the pilot signals; and
concatenate the observation vectors to generate the augmented observation vector.

5. The WTRU according to claim 1, wherein the processor is further configured to:
perform a Least-Squares (LS) algorithm using the channel delay parameters to estimate the channel information.

6. A method for channel estimation, performed by a wireless transmit/receive unit (WTRU), comprising:
receiving a plurality of input signals;
generating a plurality of sensing matrices for the input signals;
generating an augmented sensing matrix and an augmented observation vector according to the sensing matrices and the input signals;
estimating a plurality of channel delay parameters by performing a Compressive Sensing (CS) algorithm using the augmented sensing matrix and the augmented observation vector; and
estimating channel information according to the channel delay parameters.

7. The method according to claim 6, further comprising:
concatenating the sensing matrices to generate the augmented sensing matrix.

8. The method according to claim 6, wherein the input signals include a plurality of pilot signals.

9. The method according to claim 8, further comprising:
transforming the input signals into a plurality of frequency domain signals;
extracting a plurality of observation vectors from the frequency domain signals according to positions of the pilot signals; and
concatenating the observation vectors to generate the augmented observation vector.

10. The method according to claim 6, further comprising:
performing a Least-Squares (LS) algorithm using the channel delay parameters to estimate the channel information.

11. A wireless transmit/receive unit (WTRU) comprising:
a receiver configured to receive a plurality of input signals;
a processor coupled to the receiver and configured to:
generate a plurality of sensing matrices for the input signals;
generate an augmented sensing matrix and an augmented observation vector according to the sensing matrices and the input signals;
estimate a plurality of channel delay parameters according to the augmented sensing matrix and the augmented observation vector; and
estimate channel information by performing a Least-Squares (LS) algorithm using the channel delay parameters.

12. The WTRU according to claim 11, wherein the processor is further configured to:
concatenate the sensing matrices to generate the augmented sensing matrix.

13. The WTRU according to claim 11, wherein the input signals include a plurality of pilot signals.

14. The WTRU according to claim 13, wherein the processor is further configured to:
transform the input signals into a plurality of frequency domain signals;
extract a plurality of observation vectors from the frequency domain signals according to positions of the pilot signals; and
concatenate the observation vectors to generate the augmented observation vector.

15. The WTRU according to claim 11, wherein the processor is further configured to:
perform a Compressive Sensing (CS) algorithm using the augmented sensing matrix and the augmented observation vector to estimate the channel delay parameters.

16. A method for channel estimation, performed by a wireless transmit/receive unit (WTRU), comprising:
receiving a plurality of input signals;
generating a plurality of sensing matrices for the input signals;
generating an augmented sensing matrix and an augmented observation vector according to the sensing matrices and the input signals;
estimating a plurality of channel delay parameters according to the augmented sensing matrix and the augmented observation vector; and
estimating channel information by performing a Least-Squares (LS) algorithm using the channel delay parameters.

17. The method according to claim 16, further comprising:
concatenating the sensing matrices to generate the augmented sensing matrix.

18. The method according to claim 16, wherein the input signals include a plurality of pilot signals.

19. The method according to claim 18, further comprising:
transforming the input signals into a plurality of frequency domain signals;
extracting a plurality of observation vectors from the frequency domain signals according to positions of the pilot signals; and
concatenating the observation vectors to generate the augmented observation vector.

20. The method according to claim 16, further comprising:
performing a Compressive Sensing (CS) algorithm using the augmented sensing matrix and the augmented observation vector to estimate the channel delay parameters.

* * * * *